June 9, 1931.  E. C. GLARDON  1,809,480
STRAP STRETCHING AND SEALING MECHANISM
Filed Dec. 18, 1929  2 Sheets-Sheet 1

E. C. Glardon
INVENTOR

By: Marks & Clerk
Attys.

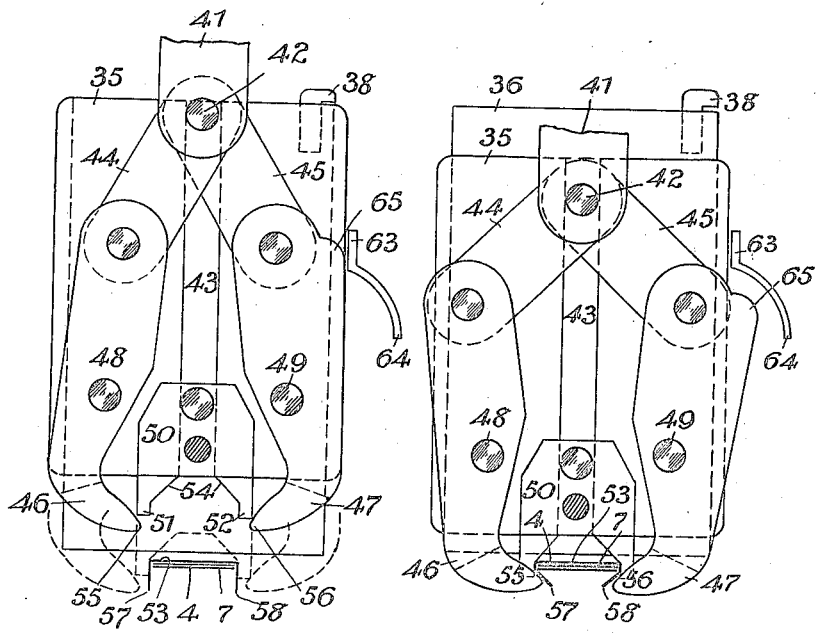
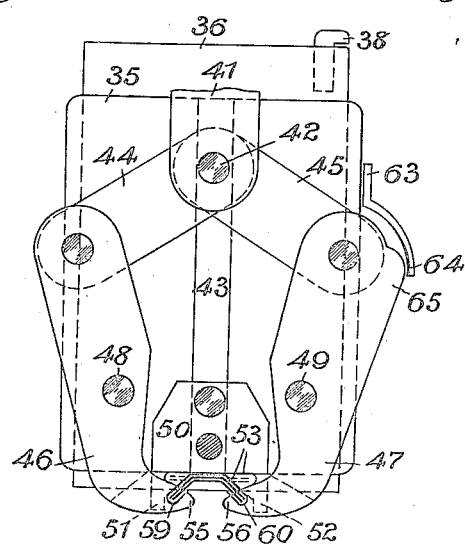

Patented June 9, 1931

1,809,480

UNITED STATES PATENT OFFICE

EDOUARD CHARLES GLARDON, OF HAMBURG, GERMANY

STRAP STRETCHING AND SEALING MECHANISM

Application filed December 18, 1929, Serial No. 415,093, and in Germany October 31, 1929.

This invention relates to an improved stretching and sealing device for straps banding packing cases, boxes, bales and other packages.

Special objects of the invention are to simplify and cheapen the construction, and to render more efficient, serviceable and durable in operation devices of the kind referred to.

With these ends in view the invention consists in the novel combination, arrangement and adaptation of parts, all as more fully hereinafter explained, shown in the accompanying drawings and then specifically set out in the appended claims.

Figure 1:
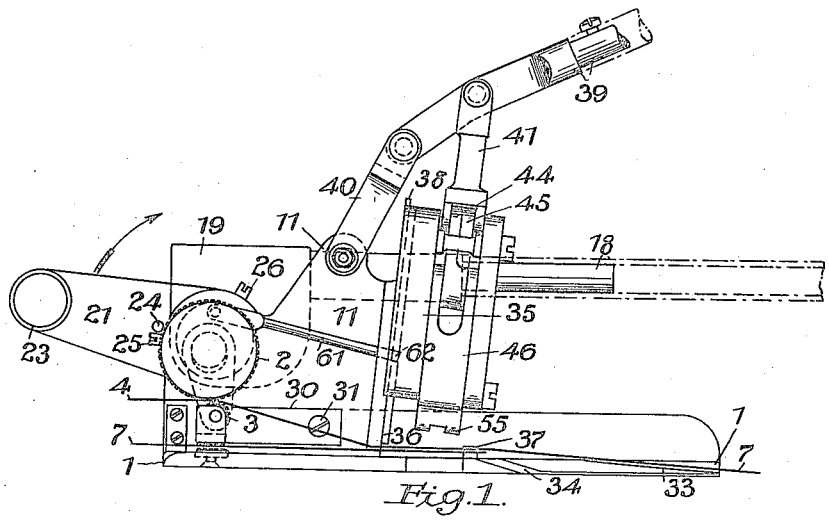
Figure 2:
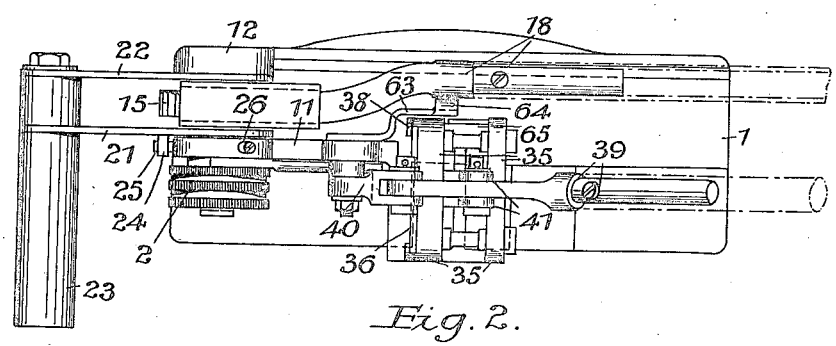
Figure 3:
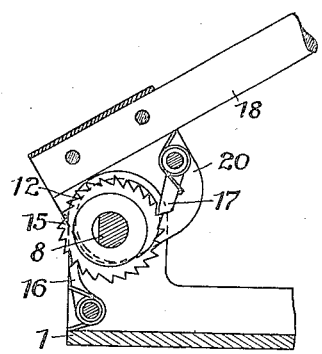
Figure 4:
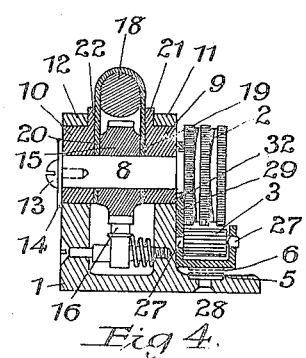

Fig. 1 of the accompanying drawings represents a side view of the improved stretching and sealing device, Fig. 2 is a top view of the same, Fig. 3 is a sectional view of the device for operating the stretching tool, Fig. 4 is an axial section of the stretching device, Fig. 5 is a view shewing the sealing device in position of rest, Fig. 6 is a view shewing the sealing device partly operated, and Fig. 7 is a view shewing the sealing device fully operated.

The improved stretching and sealing device comprises a base plate 1 carrying at one end a pair of brackets 11 and 12 wherein coaxial discs 9 and 10 are rotatably mounted. The discs serve as bearings for a shaft 8 which is held therein in an eccentric position so that it can be raised and lowered by a rotation of the discs. A screw 13 and a washer 14 fix the shaft 8 against axial displacement. Arms 21 and 22 on the two discs are connected to a handle 23 whereby the discs can be operated in unison, the movement being limited by abutments 25 and 26 which are mounted on the bracket 11 and which co-operate with a stud 24 connected to the arm 21. A ratchet wheel 15 is keyed to the shaft 8 between the two discs 9 and 10, and at opposite sides of this wheel the members 19 and 20 of a U-shaped plate are mounted rotatably on the shaft. The plate is connected to a lever 18 and carries a spring-controlled pawl 17 which engages the wheel 15 so as to impart rotation to the shaft 8 on the lever being rocked. Another pawl 16 mounted between the brackets 11 and 12 engages the wheel so as to prevent retrograde movement thereof. Secured to one end of the shaft 8, outside the bracket 11, is a milled or toothed roller 2, and beneath the latter there is a roller 3 which is mounted by means of trunnions 27 in a U-frame 28. The latter has an arm 29 which is mounted by means of a slot 32 on the shaft 8 between the disc 9 and the roller 2. Another arm 30 on the frame 28 extends horizontally and is pivoted at 31 to an extension of the bracket 11. Under the frame 28 there are two toothed or roughened clamping plugs 5 and 6 the latter of which is detachably secured to the frame and the other to the base plate 1. The slot 32 is elongated so as to allow the frame 28 to be turned together with the roller 3 about the pivot 31 for pressing the rollers 2 and 3 together as well as for pressing the plugs 5 and 6 together.

Formed integrally with and arranged at right angles to the bracket 11, is a substantially vertical plate 36 whereon a slide 35 is guided. The slide is composed of two spaced plates between which a pair of double-armed jaws 46 and 47 are mounted on pivots 48 and 49. There is also between the plates composing the slide 35 and between the jaws 46 and 47, a swage block 50 which is firmly secured to the plates and which has a recess 54 with sloping sides wherein the metal strap used for banding packages is sheared transversely through a small distance by means of the jaws. The latter work in slots in the block members 51 and 52 at opposite sides of the recess 54 and co-operate with the edges of the slots for partly cutting the strap at its edges.

The slide and the jaws are operated by means of a hand lever 39 which is connected by means of a link 40 to the bracket 11. The lever 39 carries a link 41 provided with a forked end whereby it engages a bolt 42 which is guided at its ends in vertical grooves 43 made in the plates of the slide 35. Two links 44 and 45 engage the bolt 42 within the fork of the link 41 and are pivoted to the upper ends of the jaws 46 and 47. The downward movement of the lever 39 in the first instance allows the slide 35 to descend to its lowermost position, whereupon the jaws 46 and 47 are actuated for sealing the strap. The movements of the slide 35 are limited by stops 37 and 38. In the top position of the slide the outward movement of the upper ends of the jaws 46 and 47 is prevented by a guide plate 63 connected to the bracket 11, the jaw 47 having a shoulder 65 adapted to take the thrust against the guide plate. A curved extension 64 of the guide plate is adapted to engage the shoulder 65 so as to ensure an opening of the jaws before the slide can be raised from its lowermost position.

Pivoted to the bearing disc 9 is a latch rod 61 which is guided in an aperture in the plate 36 and which, when the disc is turned for raising the shaft 8, enters a slot 62 in the slide 35 so as to lock the latter in raised position.

The base plate 1 has an inclined surface 33 and also an inclined lateral slot 34 either of which may serve as a guide for the metal strap to be stretched.

The action is as follows:—

The apparatus is placed on the box or bale or other package to be strapped, after said package has been encircled by the metal strap. The portion 7 of the strap is inserted between the separated clamping plugs 5 and 6 so that it extends under the upper portion 4 of the strap beyond the slide 35. The upper portion 4 of the strap is brought to run over the inclined surface 33 or is inserted in the slot 34, whereupon it is passed beneath the slide 35 of the sealing device and is finally inserted between the separated rollers 2 and 3. Thus the portions 4 and 7 of the strap which encircles or bands the package overlap one another beneath the slide 35 of the sealing device. After a metal sleeve or clip 53 has been placed transversely on the overlapping portions of the strap under the slide 35 the handle 23 is operated so as to lower the shaft 8. The frame 28 is lowered together with the shaft and when it is stopped by the clamping plug 6 abutting against the strap portion 7 on the clamping plug 5, the roller 2 will approach the roller 3 and apply pressure to the strap portion 4 resting thereon, said pressure being transmitted to the strap portion 7 through the intermediary of the frame 28 with its clamping plug 6, so that both portions of the strap will be firmly gripped between independent elements. Thereupon the lever 18 is rocked for turning the roller 2 which acts as a feed roller in conjunction with the roller 3 for stretching and tensioning the strap. This stretching and tensioning of the strap can be continued to an utmost degree without fear of breaking the strap owing to the strap portion 4 being fed separate from the stationary strap portion 7.

As the shaft 8 is lowered, the latch rod 61 is withdrawn from the slide 35 of the sealing device so as to free the latter. Thus after the use of the stretching device, the sealing device can be operated by a depression of the lever 39. Fig. 5 shews the top position of the slide 35 of the sealing device. In this position the jaws 46 and 47 are controlled by the guide plate 63 which prevents them from being oscillated. The jaws will therefore remain open while the slide 35 is lowered on to the overlapping portions of the strap. When the slide 35 abuts against the stop 37 the continued depression of the lever 39 operates the jaws 46 and 47, so that their teeth 55 and 56 enter the slots in the lower extensions 51 and 52 of the swage block 50 and exert pressure against the edges of the sleeve or against the marginal portions 57 and 58 of a U-shaped clip 53 if such is used instead of a sleeve, as shown in Fig. 6. On further depression of the lever 39 the teeth 55 and 56 engage under the enveloped strap cutting the latter at its edge portions and forcing it into the recess 54 of the swage block 50. By co-operation with the inclined edges of the recess 54 of the swage block 50 tongues 59 and 60 are formed at an angle to the horizontal plane of the strap, these tongues sealing the portions 7 and 4 of the strap firmly together, as shewn in Fig. 7. On the movement of the lever 39 being thereupon reversed, the jaws 46 and 47 as well as their teeth 55 and 56 will first be opened so as to release the sealed strap, this movement being controlled by the curved extremity 64 of guide plate 63, and the slide 35 will thereupon be raised into the position of rest. The portion 4 of the strap can now be cut between the stretching and the sealing devices whereupon the shaft 8 is to be raised by means of the handle 23 so as to separate the rollers 2 and 3 as well as the clamping plugs 5 and 6 and lock the slide 35 in position of rest by means of the latch rod 61. The apparatus can then be withdrawn by lateral movement from the sealed strap.

The device may be modified within the scope of the invention.

I wish it to be distinctly understood, that I do not limit myself to the precise constructions shown, variations in the arrangement and combination of the several parts being possible according to desire or requirement without departing from the scope and spirit of the invention.

What I do claim as my invention and desire to secure by Letters Patent is:

1. An improved stretching and sealing mechanism for straps banding packing cases, boxes, bales and other packages, comprising a pair of feed rollers, a shaft to which one of said rollers is secured, eccentric bearings for said shaft, means for rotating said bearings, a slotted frame carrying the second roller and guided by means of its slot on said shaft, a strap clamping plug arranged under the frame so as to take the thrust of the latter, the rotation of said eccentric bearings lowering the shaft and causing the movement of the frame relatively to the clamping plug and causing the feed rollers to be pressed together, and means for rotating the shaft so as to stretch a strap placed between the feed rollers while one end of said strap is held stationary between the frame and clamping plug.

2. The structure claimed in claim 1 in combination with a sealing device and a latch controlled by the eccentric bearings and adapted to engage and lock the sealing device in position of rest when the bearings are turned for separating the feed rollers.

3. The structure claimed in claim 1 in combination with a sealing device and a rod connected pivotally to one of the eccentric bearings, said sealing device including a slide, a guide member for the slide of the sealing device having an aperture wherein said rod is guided, the slide having a slot adapted to receive the end of said rod so as to lock the slide in position of rest when the bearings are turned for separating the feed rollers and the clamping plug.

In witness whereof I have hereunto signed my name this 29 day of November, 1929.

EDOUARD CHARLES GLARDON.